United States Patent [19]

Reedy

[11] 4,077,639

[45] Mar. 7, 1978

[54] SNOWMOBILE SKI KEEL

[75] Inventor: Donald Reedy, West Branch, Mich.

[73] Assignee: Special Sports Products Corporation, West Branch, Mich.

[21] Appl. No.: 651,979

[22] Filed: Jan. 23, 1976

[51] Int. Cl.² .......................................... B62M 27/02
[52] U.S. Cl. ..................................... 280/28; 180/5 R
[58] Field of Search .................. 280/28, 608; 180/5 R

[56] References Cited

U.S. PATENT DOCUMENTS

| 3,381,972 | 5/1968 | Miller | 280/608 |
|---|---|---|---|
| 3,850,440 | 11/1974 | Reedy | 280/28 |
| 3,877,713 | 4/1975 | Mabie | 180/5 R |
| 3,942,812 | 3/1976 | Kozlow | 280/28 |

Primary Examiner—Robert R. Song

[57] ABSTRACT

A steering keel for a snowmobile ski including a longitudinally extending wear bar adapted to be mounted on the underside of the ski and having downwardly converging, elongate side faces, a hardened wear rail mounted on the underside of said wear bar and having elongate, downwardly converging, edge defining side faces which abut, and are in alignment with, the downwardly converging side faces of the wear bar to enhance the penetration of the steering keel into the surface being traversed.

5 Claims, 7 Drawing Figures

SNOWMOBILE SKI KEEL

BACKGROUND OF THE INVENTION

This invention relates to an improved steering keel for a snowmobile ski and more particularly to a steering keel which is constructed to enhance the steering characteristics of a snowmobile being propelled.

Snowmobile operators frequently encounter difficulty in negotiating turns when the snowmobile is traversing ice or hardened snow. The skiis, which are conventionally pivotally mounted at the front of a snowmobile to control the direction of snowmobile travel, frequently tend to slide over the ice and hardened snow and the turning radius is greatly increased. When snowmobiles are being raced, or otherwise traveling in groups, accidents frequently result when a snowmobile operator is unable to positively turn the snowmobile in a predetermined arc. Racers, who negotiate turns at extremely high velocities, are particularly concerned with predictable steering characteristics.

When the snowmobile skiis do not bite into the surface being traversed and a snowmobile slides through a turn, snowmobile operators frequently oversteer in the direction of the turn. When the turn is completed, the driver frequently encounters difficulty in regaining full and complete control of the snowmobile because the driver will sometimes oversteer in the opposite direction. The driver must continue to adjust the steering until full control is resumed.

It has been found that if the snowmobile keel obtains good bite into the surface being traversed, the snowmobile racer need not turn the skiis as much in the direction of the turn to negotiate a curve. This minimizes the "backlash" effect and provides much more positive and reliable steering.

One way to obtain increased bite is to add weight to the front of the snowmobile for the purpose of increasing the downward force exerted on the skiis in an attempt to force the steering keels mounted on the undersides of the skiis into biting engagement with the ice. This has the disadvantage of increasing the drag on the forward skiis and racing speed on the straight away portion of the race track is accordingly reduced.

With apparatus constructed according to the present invention, weight may be rearwardly shifted from the front to the rear of the snowmobile. This has the attendant advantage of increasing the downward force exerted on the snowmobile drive track, which is conventionally mounted at the rear of the snowmobile, and thus the traction of the drive track is increased. Slippage of the track is thereby reduced and the track studs better penetrate the ice and thus the forward propelling characteristics of the track is enhanced. Another attendant advantage of rearwardly shifting the weight from the forwardly disposed steering skiis to the endless drive track is that the power required to overcome the frictional forces between the front steerable skiis and the surface being traversed is reduced and thus not as much power is required to forwardly propel the snowmobile.

Accordingly, it is an object of the present invention to provide a snowmobile ski which will provide positive steering capabilities.

It is another object of the present invention to provide a snowmobile ski which will enhance the reliability of a snowmobile turning in a predictable arc even though ice is being traversed.

It is another object of the present invention to provide a keel for a snowmobile ski which will enhance the bite into the surface being traversed.

It is another object of the present invention to provide a snowmobile keel with reduced drag characteristics.

It is a further object of the present invention to improve the overall steering and propelling characteristics of a snowmobile.

A still further object of the present invention to provide a snowmobile ski keel including a wear rail having downwardly converging side faces terminating in an ice penetrating edge and a mounting bar for the wear rail having downwardly converging side faces which abut, and lie in the same planes, as, the side faces of the rail.

Snowmobiles involved in racing conventionally travel in only one direction about an endless race track. With skags or keels constructed according to the present invention the steering characteristics for turning in one direction only are enhanced. Accordingly, it is yet another object of the present invention to provide a pair of snowmobile skags or blades for use on the underside of snowmobile skiis which presents upstanding walls on the outboard side of the turn for bearing against the ice.

It is another object of the present invention to provide a snowmobile keel which is particularly adapted for snowmobile racers travelling in one direction about an endless track.

Still another object of the present invention is to provide a snowmobile ski including an underlying keel having a hardened wear rail provided with a side face which is generally vertically disposed when the ski is tilted to negotiate a turn.

Other objects and advantages of the present invention will become apparent to those ordinary skill in the art as the description thereof proceeds.

SUMMARY OF THE INVENTION

A snowmobile ski comprising a generally horizontal, longitudinally extending, generally planar runner turnable about a longitudinal axis between a running position and a vertically inclined position; and a keel mounted on the underside of the runner including a longitudinally extending wear bar portion and a wear rail portion, harder than the wear bar portion, at the underside of the wear bar portion. The wear rail portion includes elongate, downwardly converging side faces terminating in an elongate edge engageable with the surface being traversed. The edge lies in a vertical plane and an intersecting plane parallel to the plane of the runner in the running position. One of the side faces is disposed on one side of the vertical plane between the vertical plane and the second plane when the runner is in the horizontally disposed position and when the runner is in the vertically inclined position. The other of the side faces is generally upstanding and moves in a direction from the opposite side of the vertical plane to the one side of the vertical plane when the runner turns from the horizontally disposed position to the vertically inclined position such that the other upstanding face is disposed in a position interjacent the vertical plane and the second plane when the runner is in the vertically inclined position.

The present invention may more readily be understood by reference to the accompanying drawings in which.

DESCRIPTION OF THE PREFERRED EMBODIMENT

Figure 1:
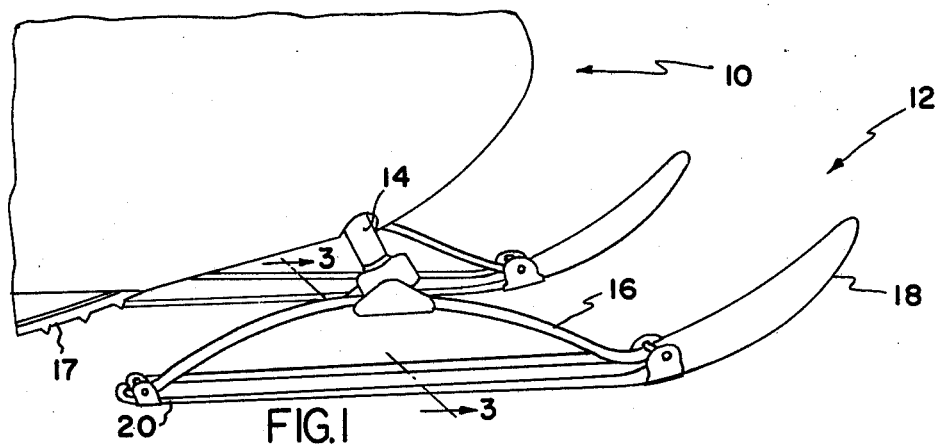
FIG. 1 is a perspective view illustrating a snowmobile mounting apparatus constructed according to the present invention.
Figure 2:
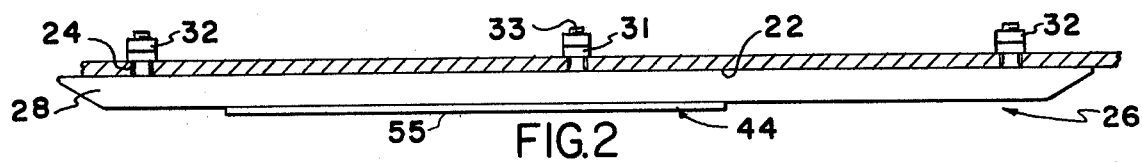
FIG. 2 is an enlarged, fragmentary sectional side view illustrating a snowmobile ski mounting a snowmobile keel constructed according to the present invention.

Apparatus constructed according to the present invention is particularly adapted for use with a snowmobile, generally designated 10. The snowmobile 10 mounts a pair of longitudinally extending, generally planar, steerable skiis, generally designated 12, for turning or pivotal movement on a pair of laterally spaced, depending king pins 14 supported by the skiis via leaf springs. generally designated 16. The skiis 12 are generally parallel to each other and to the path of the snowmobile when the snowmobile is forwardly propelled. The skiis 12, which include upturned forward ends 18 and trailing ends 20 are turned by steering handles (not shown) to positions transverse to that illustrated in FIG. 1. An endless drive track 17 is mounted at the rear end of the vehicle 10 for forwardly driving the vehicle, as usual. The ski runner 12 includes a longitudinally extending, depressed rib section 22 having a plurality of apertures 24 therein for a purpose to become immediately apparent. Conventionally, snowmobiles are raced in a closed circuit, endless track having straight away track portions and 180° end turn track portions. The snowmobiles are conventionally raced in such a direction that the driver makes left turns only and the left and right skiis 12 are thus commonly referred to as the inboard and outboard skiis respectively.

Figure 3:
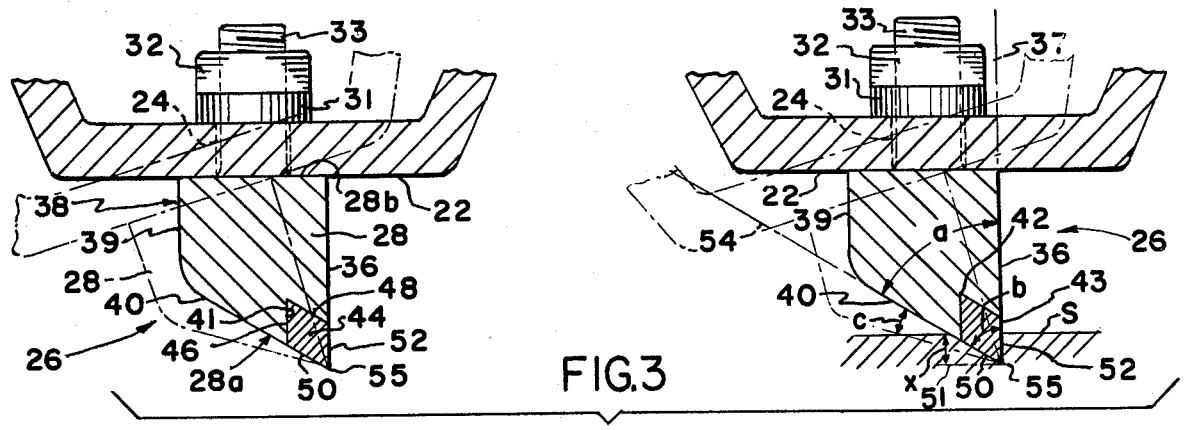
FIG. 3 is a still further enlarged sectional end view of a pair of snowmobile skiis mounting keels constructed according to the present invention, taken along the line 3—3 of FIG. 1.

A skag, keel, or runner blade, generally designated 26, is mounted on the underside of each ski runner 12 for enhancing the turning characteristics of the snowmobiles skiis. The keel 26 includes a generally rigid, elongate wear bar 28, removably coupled to the underside of ski rib section 22 via a plurality of longitudinally spaced upstanding threaded bolts 33. The wear bar 28 includes a bottom face 28a and an upper face 28b mounting the bolts 33 which are received in the rib apertures 24 and are secured in place via washers 31 and nuts 32. The generally planar upper bearing surface 28b bears against the underside of the ski rib section 22. The wear bar 28 is mounted such that one face or outboard side surface 36 of the bar 28 is perpendicular to the plane of the ski 12 and lies in a vertical plane 37 normally perpendicular to a horizontal surface S being traversed when the ski 12 is horizontally disposed as illustrated in FIG. 3. As illustrated in FIG. 3, the vertical wall or outboard face 36 on each of the inboard and outboard ski 12 faces the outside or outboard side of the turn and is disposed on the outboard side of each ski 12 whereas the vertical face 39 on the ski at the inside of the turn is disposed on the inboard side of the ski. The vertical walls or faces 36 are both disposed on the outboard side of the turn to present a substantial side bearing surface.

The opposite side surface 38 of wear bar 28 includes an upper vertical wall surface 39 parallel to the opposed bar surface 36 and a vertically inclined wall surface 40 which converges downwardly toward the vertically disposed wall surface 36. The wall surface 40 lies on the inboard side of vertical plane 37 and remains on the inboard side of plane 37 when the ski runner 12 is horizontally disposed and when the ski runner 12 is vertically inclined, as illustrated in chain lines in FIG. 3. The lower face 28a of the wear rail 28 includes upwardly converging elongate surfaces 41 and 43 defining an elongate V-shaped notch 42 extending the length of the wear bar 28 for a purpose to become immediately apparent.

A wear rail, generally designated 44, which is diamond shaped in end cross section, is mounted on the lower face 28a and includes upwardly converging, elongate surfaces 46 and 48 which are complemental to the upwardly converging surfaces 41 and 43 which define the notch 42. The wear rail 44, which is fabricated from tungsten carbide and the like having a hardness substantially greater then the hardness of the wear bar 28, is secured to the wear bar 28 via brazing or the like. The hardened carbide wear rail 44 is brittle.

The carbide wear rail 44 includes downwardly converging, elongate lower surfaces or faces 50 and 52 which terminate in an elongate ice penetrating edge 55 and are aligned with the surfaces or faces 40 and 36 respectively of the overlying wear bar 28. The upstanding side face 52 is normal to the plane of the ski runner 12 and faces the outboard side of the turn. When the ski runner 12 is in the horizontal running position illustrated in FIG. 3, the wear rail face 50, which faces the inboard side of the turn, and the wear bar face 40 lie in a vertically inclined plane 54 and the faces 36 and 41 lie in a vertical plane 37. The ice penetrating edge 55 lies in the intersecting planes 54 and 37. The edge 55 also lies in a plane 51 which is parallel to the plane of the ski runner 12 when the ski runner 12 is in the horizontal position illustrated in solid lines in FIG. 3. The angle *a* between the carbide wear bar faces 36 and 40 and the angle *b* between the downwardly converging rail faces 50 and 52 is 60°. The angle *c* between the vertically inclined plane 54 and the horizontal surface S is 30°. If the wear bar surface 40 was inclined, for example, at an angle of 15° to the horizontal surface S and the adjacent inclined wear rail face 50 remained at an angle of 30° to the horizontal, when the keel penetrates the surface S to the distance X, the penetration might be substantially inhibited. Because the wear bar surfaces 40 and the wear rail surface 50 are flush with each other and because the wear bar surface 36 and the wear rail surface 44 are also flush with each other, the penetration of the skag into the surface S will not be inhibited as it otherwise would be if the wear rail and wear bar side faces 40, 36 and 50 and 56 were not aligned.

The carbide insert or wear rail 44, which is diamond shaped in cross-section, is wedged upwardly into the slot or notch 42 cut in the lower face of the wear bar 26.

THE OPERATION

The longitudinal ski runners 12 are horizontally disposed, as illustrated in FIG. 3, and parallel to each other and to the path of the snowmobile when the snowmobile 10 is being forwardly propelled. When the operator turns the snowmobile steering handles (not shown) to the left, for example, so as to negotiate a 180° loop turn at the end of the straightaway, the skiis 12 are pivoted about the axes of the king pins 14 such that the forward ends 18 also turn to the left to transverse positions. The skiis 12 will concurrently cant or rotate about their longitudinal axes to the positions illustrated in chain lines in FIG. 3. The previously vertical wear bar surface 36 will be moved in a direction toward the same side of said plane 37 on which the wear rail surface 40 is located to a position inclined to the vertical plane 37 as illustrated in chain lines to FIG. 3.

The vertical wear rail surface 52 presents a substantial vertical bearing surface against which the snow and ice bear as the snowmobile negotiates the turn. The vertical surface 52 substantially enhances the turning characteristics and ice gripping characteristics of the snowmobile ski. If penetration is to a depth greater than the height of the side face 43, the wear bar surface 36 will also present a substantial bearing surface.

Because of the increased penetrating characteristics, weight which might otherwise be required to accomplish such penetration can now be rearwardly shifted to the endless drive belt 17. The added force exerted on the drive belt 17 reduces the belt slippage on the surface being traversed and thereby improves the forward propelling characteristics of the snowmobile. The use of the keel constructed according to the present invention provides predictable turning and thus a substantially safer operating snowmobile.

ALTERNATE EMBODIMENT

Figure 4:
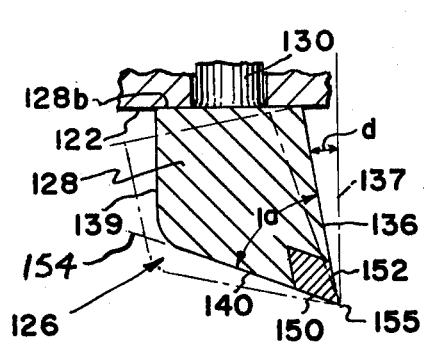
FIG. 4 is a sectional end view similar to FIG. 3, illustrating a slightly modified keel construction.

Referring now to FIG. 4, a slightly modified keel 126 is shown. The keel illustrated in FIG. 4 is substantially identical to that illustrated in FIG. 3 and corresponding parts are identified with corresponding numerals plus the prefix numeral 1. The keel 126 comprises an elongate bar 128 having an upper flat surface 128b bearing against the underside of the longitudinal ski rib section 122. The wear bar 128 is coupled to the ski via threaded bolts 130. The keel 126 differs from the keel 26 in that the surface 136 is undercut and inclined at an angle $d$, i.e. 10°, to a vertical plane 137. The angle $a$ between the opposed wear bar surface 140 and the wear bar surface 136 remain at 60° and the angle between the downwardly converging rail surfaces 150 and 152 remains at 60°. The upper converging wear bar surfaces 136 and 140 and the lower converging wear rail surfaces 150 and 152 are all located on one side of a plane which is perpendicular to the plane of ski runners 122 and intersects the ice penetrating edge 155. When the ski runner is turned to the inclined position illustrated in chain lines, the wear bar surface 136 and wear rail surface 152 are moved in a direction from the outboard side of said plane 137 to the inboard side of said turn as illustrated in chain lines in FIG. 4.

ALTERNATE EMBODIMENT

Figure 5:
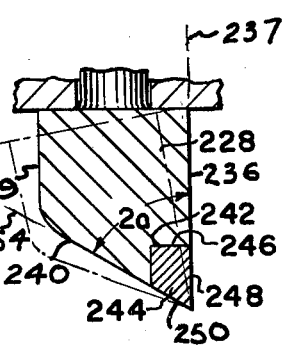
FIG. 5 is a sectional end view illustrating another modified construction.

Referring now to the embodiment illustrated in FIG. 5, parts corresponding to the parts illustrated in FIG. 3 are identified with corresponding numerals plus the prefix numeral 2. The keel 226 illustrated in FIG. 5 is substantially identical to the keel illustrated in FIG. 4 with the exception that the notch 242 at the underside of the wear bar 228 is formed with a 90° angle. The upper half of the wear rail 228 is rectangular in end cross-section. The upper, converging rail surfaces 246 and 248 of the carbide wear rail 244 are horizontal and vertical respectively and are snugly received in the elongate notch 242.

ALTERNATE EMBODIMENT

Figure 6:
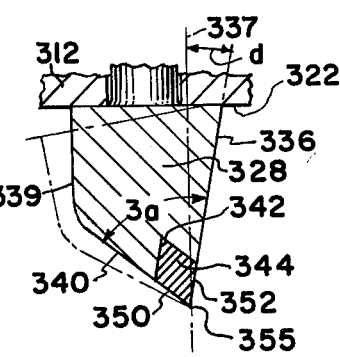
FIG. 6 is a sectional end view illustrating still another modified construction.

The keel 326 illustrated in FIG. 6, is similar to that keel disclosed in FIG. 3 and corresponding parts are identified with corresponding numerals plus the prefix numeral 3. In the embodiment illustrated in FIG. 6, the wear bar surface 336 is disposed on the outboard side of a vertical plane 337 which is normal to the plane of the ski 322 when the ski 322 is horizontally disposed as is illustrated in FIG. 6. The wear bar face is vertically inclined at an angle $d$ to the vertical plane 337 and converges toward the downwardly inclined wear bar surface 340 at an angle $a$ of 60°. The notch 342 in the underside of the wear bar 328 is identical to the notch 42 and the carbide insert 344 is identical to the carbide wear rail 44. When the snowmobile negotiates a turn, the skiis 312 cant about their longitudinal axes, to the vertically inclined positions illustrated in chain lines in FIG. 6. The elongate wear rail surface 352 will lie in a vertical plane 337 and will present a substantially vertical wall against which the snow and ice bear to increase the bite and provide positive turning.

The generally upstanding wear rail side face 352 moves from one side of the vertical plane 337 in a direction toward the opposite side of the vertical plane so as to be disposed in said vertical plane when the snowmobile ski 312 is in the chain line position.

ALTERNATE EMBODIMENT

Figure 7:
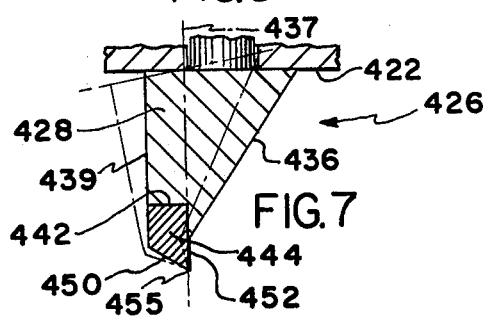
FIG. 7 is a sectional end view illustrating yet another modified construction.

The keel 426 illustrated in FIG. 7 is similar to keel illustrated in FIG. 3 and corresponding parts identified with corresponding numerals plus the prefix numeral 4.

In the embodiment illustrated in FIG. 7, the wear bar 428 includes a vertical surface or wall 439 on the inboard side of the turn and a vertically inclined opposed elongate wear surface 436 on the outboard side thereof. A notch 442 is provided in the underside of the wear bar and receives a wear rail generally designated 444. A notch 442 is rectangularly shaped and the upper converging surfaces of the wear rail 444 are complementally rectangularly shaped to be snugly received therein.

The wear bar 444 includes a generally vertical face 452 which faces the outboard side of the turn and a vertically inclined lower surface 450 which faces the inboard side of the turn. The surfaces 450 and 452 converge to an ice penetrating edge 455. The wear rail 452 is so mounted that the side face 452 lies in a vertical plane 437 which is perpendicular to the plane of the ski 422 when the ski 422 is horizontally disposed. When the ski negotiates a turn and cants to the position illustrated in chain lines in FIG. 7, the upstanding side faces 452 swings to the position, illustrated in chain lines in FIG. 7, to an undercut position in which it bears against the ice and snow.

It is to be understood that the drawings and descriptive matter are in all cases to be interpreted as merely illustrative of the principles of the invention, rather than as limiting the same in any way, since it contemplated that various changes may be made in various elements to achieve like results without departing from the spirit of the invention or the scope of the appended claims.

What I claim is:

1. A steering keel for a longitudinally extending, turnable snowmobile ski and the like comprising:
- a longitudinally extending host bar, adapted to be mounted on the underside of said ski, turnable with said ski about a longitudinal axis between a running position and a vertically inclined position; said host bar including inboard and outboard, elongate, downwardly converging, upper opposite side surfaces;
- a wear rail, comprised of material which is substantially harder than said host bar, mounted on said host bar at the lower edge of said host bar;
- said wear rail including elongate, inboard and outboard downwardly converging lower side surfaces lying in downwardly converging planes, said lower side surfaces terminating in an elongate, ice penetrating edge lying in a vertical plane;
- said lower side surfaces extending downwardly beyond the bottom of said host bar and being aligned with said upper side surfaces of said host bar to inhibit drag and enhance penetration of said wear rail into said surface being traversed;
- said inboard and outboard lower side surfaces lying in the planes of said inboard and outboard upper side surfaces respectively;
- said downwardly converging planes intersecting said edge; and
- means for mounting said steering keel on said ski such that
  - said upper and lower inboard surfaces lie on the inboard side of said vertical plane when said host bar is in said running position and when said host bar is in said vertically inclined position, and
  - said upper and lower outboard side surfaces are disposed in a position interjacent said vertical plane and the inboard side of said vertical plane when said keel is in said inclined position.

2. The steering keel as set forth in claim 1 including means for mounting said host bar on said ski such that both of said upper side surfaces and both of said lower side surfaces are on one side of a vertical plane intersecting said ice penetrating edge.

3. The steering keel as set forth in claim 1 wherein said host bar includes an upper face and a lower face, extending between said upper side surfaces, said lower face including a slot wherein having upwardly converging side faces; said wear bar including upwardly converging side faces complemental to the upwardly converging side faces of said slot so as to be snugly received therein.

4. The steering keel as set forth in claim 1 wherein said mount means includes means for mounting said keel such that said upper and lower outboard surfaces are vertical and normal to the plane of the ski and the surface being traversed when said keel is in said running position.

5. The keel as set forth in claim 1, wherein said upper and lower outboard surfaces lie in a generally vertical position when said keel is in said vertically inclined position.

* * * * *